(12) United States Patent
Bootsman et al.

(10) Patent No.: US 6,315,108 B1
(45) Date of Patent: Nov. 13, 2001

(54) CARRYING DEVICE FOR CARRYING A NUMBER OF PRODUCTS, AS WELL AS A SYSTEM PROVIDED WITH SUCH CARRYING DEVICE

(75) Inventors: Cornelis F. M. Bootsman, Volendam; Dré Roelf De Bos Kuil, Leusden; Gerrit De Gooyer, Veenendaal; Cornelis J. Jochemsen, Wekerom; Gerardus J. C. Van Laar, Scherpenzeel; Ronald W. Neutel, Amersfoort; Rijk Rijksen, Elspeet; Gerrit J. Scholten, Rheden; Frank R. Visscher, Bennekom; Wouter Walet, Barneveld, all of (NL)

(73) Assignee: EBM Techniek B.V., Scherpenzeel (NL)

(*) Notice: Subject to any disclaimer, the term of this patent is extended or adjusted under 35 U.S.C. 154(b) by 0 days.

(21) Appl. No.: 09/155,975

(22) PCT Filed: May 6, 1997

(86) PCT No.: PCT/NL97/00255

§ 371 Date: Oct. 9, 1998

§ 102(e) Date: Oct. 9, 1998

(87) PCT Pub. No.: WO97/42109

PCT Pub. Date: Nov. 13, 1997

(30) Foreign Application Priority Data

May 6, 1996 (NL) .................................................. 10030305

(51) Int. Cl.[7] .................................................. B65G 47/30
(52) U.S. Cl. .................. 198/690.1; 198/619; 198/867.14
(58) Field of Search ............................. 198/690.1, 465.1, 198/619, 867.14

(56) References Cited

U.S. PATENT DOCUMENTS

| | | |
|---|---|---|
| 3,366,222 | 1/1968 | Rowekamp . |
| 3,605,630 | 9/1971 | Tsuruzawa . |
| 3,917,054 * | 11/1975 | Hurst .................................. 198/690.1 |
| 4,721,199 * | 1/1988 | Ioannides .......................... 198/690.1 |
| 4,742,906 * | 5/1988 | Wallaart ............................. 198/690.1 |
| 4,836,359 * | 6/1989 | Walter .............................. 198/867.14 |
| 4,850,542 * | 7/1989 | Rechsteiner ....................... 198/690.1 |
| 5,027,942 * | 7/1991 | Wallaart ............................. 198/690.1 |
| 5,036,969 * | 8/1991 | Garbagnati ......................... 198/690.1 |
| 5,165,527 * | 11/1992 | Garbagnati ......................... 198/690.1 |
| 5,241,806 | 9/1993 | Ziegler et al. . |
| 5,735,387 * | 4/1998 | Polaniec et al. ................... 198/690.1 |
| 5,857,558 * | 1/1999 | Irvine ............................... 198/867.14 |

FOREIGN PATENT DOCUMENTS

| | | |
|---|---|---|
| 9411706 | 1/1996 | (DE) . |
| 0569684 | 11/1993 | (EP) . |
| 0600130 | 6/1994 | (EP) . |
| 2220444 | 10/1974 | (FR) . |
| 2075756 | 11/1981 | (GB) . |
| 2147867 | 5/1985 | (GB) . |

\* cited by examiner

Primary Examiner—Douglas Hess
(74) Attorney, Agent, or Firm—Dykema Gossett PLLC

(57) ABSTRACT

A system for advancing a carrying device. The carrying device is for receiving a plurality of products for processing. The carrying device has a first conveyor, and a second conveyor connected to the first conveyor for taking over a carrying device at a precisely determined distance relative to a preceding carrying device. A portion of the carrying device is made of a magnetizable material. The system has a magnet arranged for engaging the magnetizable material of the carrying device thereby engaging the carrying device onto the second conveyor from the first conveyor.

15 Claims, 11 Drawing Sheets

CARRYING DEVICE FOR CARRYING A NUMBER OF PRODUCTS, AS WELL AS A SYSTEM PROVIDED WITH SUCH CARRYING DEVICE

Known from the non-prepublished Netherlands patent application 1001505 is a device and method for buffering or temporarily storing and/or setting to pitch for instance products to be successively packaged, wherein due to the use of product carriers for a plurality of products an extremely flexible arrangement can be obtained.

The present invention provides a product carrier device for carrying a plurality of infeedable and outfeedable products which is provided with means for causing transporting means to engage precisely for stepwise and/or uniform displacement of the product carrier device.

The present invention further provides a system for advancing one or more carrying means in which is received a plurality of products for processing, comprising:
 a first conveyor for supplying the carrying means; and
 a second conveyor arranged connecting onto the first conveyor for taking over a carrying means at a precisely determined distance relative to a preceding carrying means.

Using the product carrier device and the system according to the present invention it becomes possible to position the product carriers accurately during infeed and/or outfeed of the products into and out of the product carrier, which product carriers can be supplied at random moments in time and mutual interspacing, while the position at any moment during infeed and/or outfeed of the products must be capable of precise adjustment.

In a first preferred embodiment of the present invention the gripping means comprise one or more recesses in which parts of a chain or protrusions thereon engage precisely. Due to the precise pitch distance of the links of a chain, product carriers are positioned at a precise distance relative to each other or, more particularly, they are pressed directly against each other.

In a further preferred embodiment of the present invention the gripping means comprise a plate of magnetizable material such as steel arranged in the base or side walls of a product carrier. Such product carriers can thus be held with sufficient force against a conveyor belt due to a (permanent) magnet to be mounted under this conveyor belt. Permanent magnets are now commercially available which produce a magnetic force sufficient for this purpose which is also greater than the magnetic force which can be produced by an electromagnet of similar dimensions.

In order to enable guiding of a product carrier along a reversing wheel of a conveyor belt, wherein a magnetic element is then situated in that reversing wheel, the plate of magnetizable material preferably takes a flexible form so that it can follow the shape of the reversing wheel.

In a preferred embodiment of the system according to the present invention the product carrier is pressed against a conveyor using a strong permanent magnet and a following product carrier is pulled towards a preceding one by one or more plates or strips of magnetizable material in the product carrier.

In a further preferred embodiment a product carrier is provided with friction material on side walls thereof and such a product carrier is engaged on the sides by a laterally disposed conveyor.

The present invention further provides a system wherein products are pressed out of the product carriers into a co-travelling discharge belt.

Further advantages, features and details of the present invention will be elucidated on the basis of the following description with reference to the annexed drawing, wherein.

Figure 1:
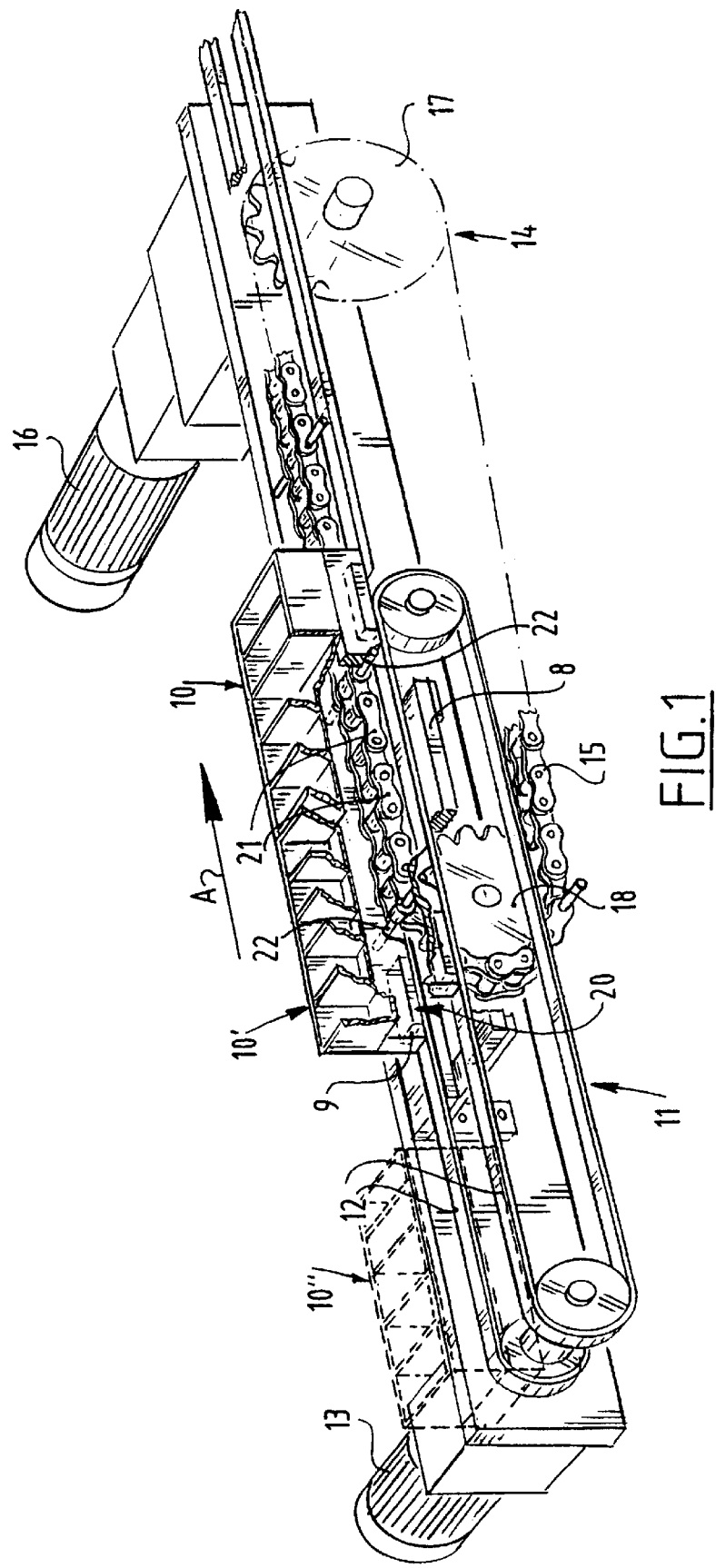
FIG. 1 shows a partly broken away view in perspective of a first preferred embodiment of the system and device according to the present invention.

Product carriers 10, 10', 10" etc. (FIG. 1) are supplied in the direction of arrow A using a transporting device 11 comprising two endless belts 12 arranged at a mutual distance and driven using an electric motor 13. Between the belts 12 extends a second transporting device 14 which comprises an endless chain 15 which is driven using an electric servomotor 16 and two toothed wheels 17 respectively 18. Arranged in the underside or base 20 of the product carrier are recesses onto which engage links 21, and in particular protrusions 22 thereon. The product carrier 10 is thus accurately positioned relative to chain 15 and relative to an infeed conveyor (not shown) for inserting products into the compartments of product carrier 10 which are then advanced one at a time in stepwise manner using the electric servomotor 16.

The belts 12 of transporting device 11 preferably have a slightly greater speed than the chain 15 so that a following product carrier, which is not shown in FIG. 1, connects precisely onto product carrier 10. Conveyor belts 12 are herein of a material such that some slip is permissible between the base 20 of product carrier 10 and these belts.

Strips of magnetizable material 9 are preferably arranged in the base 20 of product carrier 10, 10', while a strong permanent magnet 8 extends under conveyor belt 11 in order to press product carriers 10, 10' onto conveyor belt 11 and also to ensure that a following product carrier 10' is pulled towards a preceding product carrier 10 via the strips of magnetizable material 9 which in a manner not shown can extend to the end surface thereof. After this connection the further precise positioning is ensured by the protrusions 22 on chain 15.

In another system 30 (FIG. 2) according to the present invention successive product carriers 31 are provided on their underside and/or standing end walls 32 with a plate of magnetizable material 9 such as steel, while under a first conveyor 35 is disposed a strong permanent magnet 36 and under a second conveyor 33 is disposed a second permanent magnet 34 which exerts a greater magnetic force on product carriers 31, for instance because it is arranged closer to the underside of conveyor belt 38 of the second conveyor than the magnet 36 under conveyor belt 37 of conveyor 35. Each of the conveyors 33 respectively 35 is provided with an electric motor 39 respectively 40. Conveyor 35 is preferably driven at greater speed than conveyor 33, whereby product carriers 31 are joined together. The magnets under the conveyor belts provide sufficient friction between product carrier and belt and rapid movement of the product carrier for loading or unloading can be ensured. For the precise stepwise movements during loading and unloading the electric motor 39 is preferably embodied as servomotor.

Because the product carriers 31 are provided with magnetizable parts, the product carrier 31 furthest to the left is held firmly against conveyor belt 38, whereby a product carrier on conveyor belt 38 will follow the movement thereof precisely, for instance for the stepwise displacement thereof, for instance for infeed of products.

Since the magnetic force of magnet 34 is stronger than the magnetic force of magnet 36 a following product carrier is likewise pulled toward a preceding product carrier 31, whereby the product carriers follow each other in extremely close succession, which is likewise important for accurate infeed and/or outfeed of products. A product carrier is pressed against a preceding product carrier, while conveyor belt 37 can slip through beneath them while the product carrier is held against the following product carrier by means of magnetic force.

In a third preferred embodiment of the device according to the present invention a conveyor 50 (FIG. 3) is provided with a first permanent magnet 51 and a second permanent magnet 52, in addition to a magnet not shown in the figure in a reversing wheel 53. In this preferred embodiment product carriers 54 are carried back in empty state in the direction of arrow B via return part 55 of transporting device 50. A magnetizable metal plate 57 is fixed to a base part 56 of the product carrier 54 in the central part thereof, while laterally protruding parts 58 and 59 take an at least slightly flexible form so that the product carrier is held fast in any position, even in the various positions along the reversing wheel 53.

For a further increase in the magnetic force thickened metal portions 60 respectively 61 are preferably arranged on the outer ends of the side parts, which portions drop in the horizontal position thereof into recess 62 respectively 63 of the base 56 of the product carrier.

Figure 2:
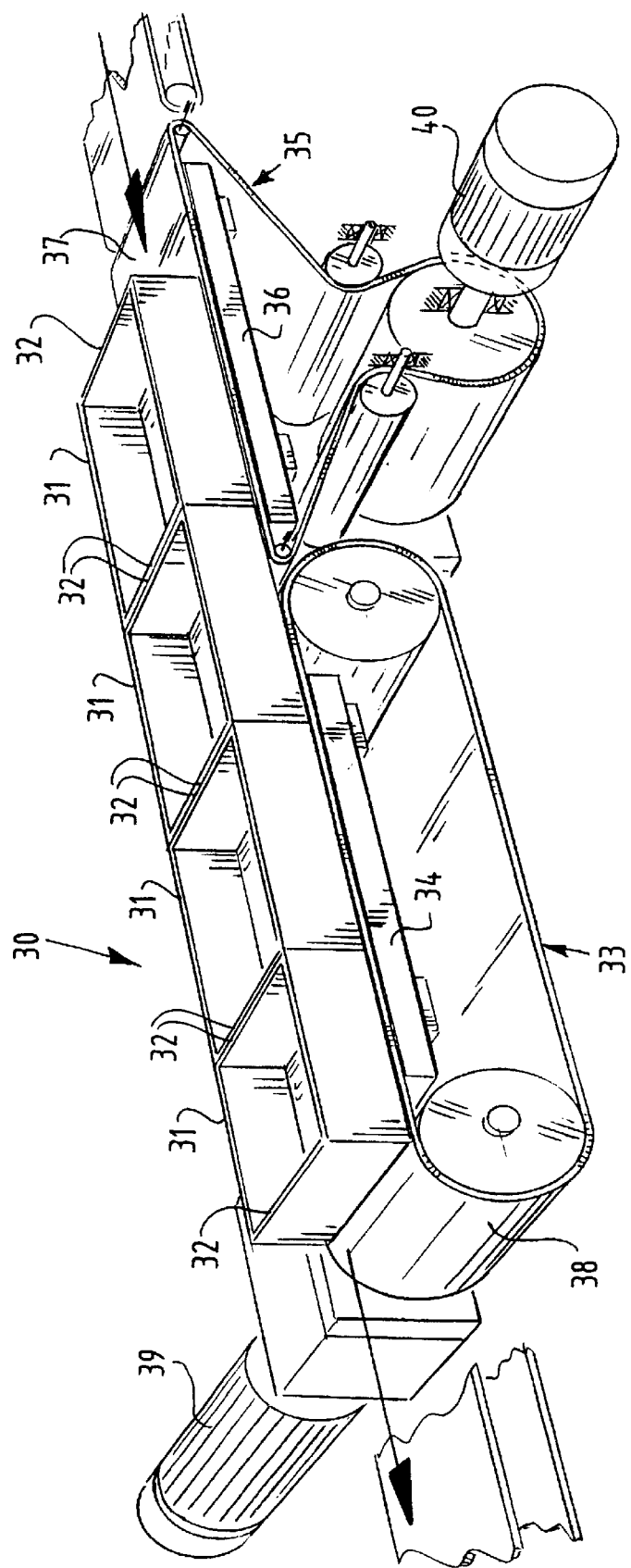
FIG. 2 shows a view in perspective of a second preferred embodiment of the system and device according to the present invention.
Figure 3:
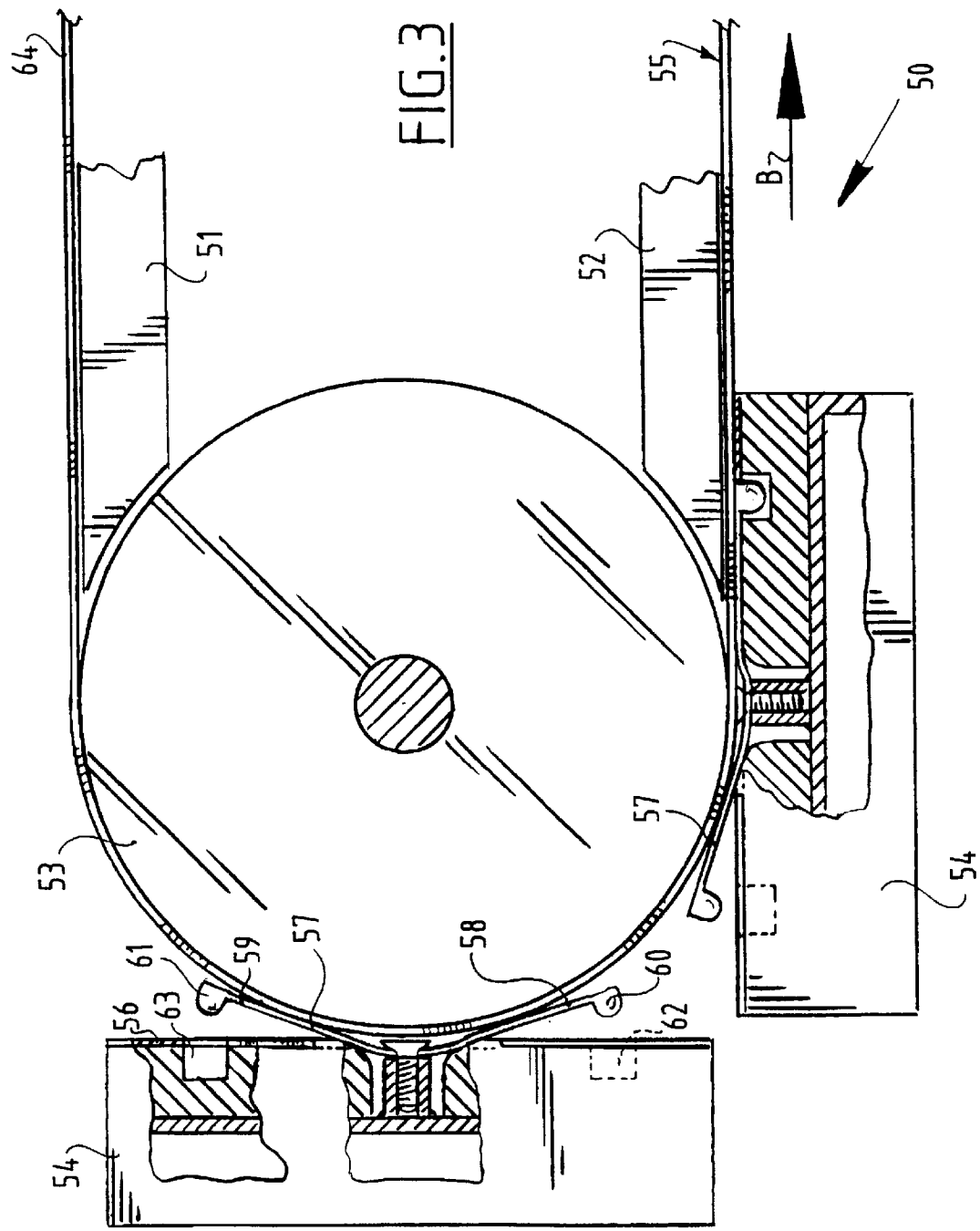
FIG. 3 shows a side view of a third preferred embodiment of a system and device according to the present invention.

In the case of the product carriers according to FIG. 3, which can likewise be used in the application shown in FIG. 2, the product carriers 54 are held firmly against conveyor belt 64 by the diverse permanent magnets, whereby the product carriers follow precisely the movement of this conveyor belt.

In a further preferred embodiment according to the present invention (FIG. 4) product carriers 60, 61, 62, 63 etc. are fed to a loading station designated schematically with S. Product carrier 60 is advanced through one position at a time using a servomotor, while a following product carrier 61 is joined onto product carriers 60 using laterally disposed conveyor belts 64 and 65, which joining must have been effected at the moment that product carriers 60 are fully loaded or unloaded at station S (see FIG. 4 under 6). Product carrier 60 can then be discharged, whereafter a following product carrier 62 must be joined onto product carrier 61.

Product carriers 60, 61 and 62 (FIG. 5) are guided along roller elements 70 and are provided on both sides with strips of friction material 71 respectively 72, while strips of friction material 75, 76, 77 and 78 are likewise arranged on conveyor belts 73, 74 of lateral conveyors 65 respectively 64. These strips of friction material are positioned such that product carrier 60 in FIG. 5 is carried along by friction strip 78 of left-hand conveyor 64, while product carrier 61 is carried along by strip 76 on right-hand conveyor 65, whereby product carriers 60 and 61 can be moved independently of each other in the direction of arrow E since the speed of product carrier 60 is determined by left-hand conveyor 64, while conveyor 65 determines the speed of product carrier 61.

Figure 6:
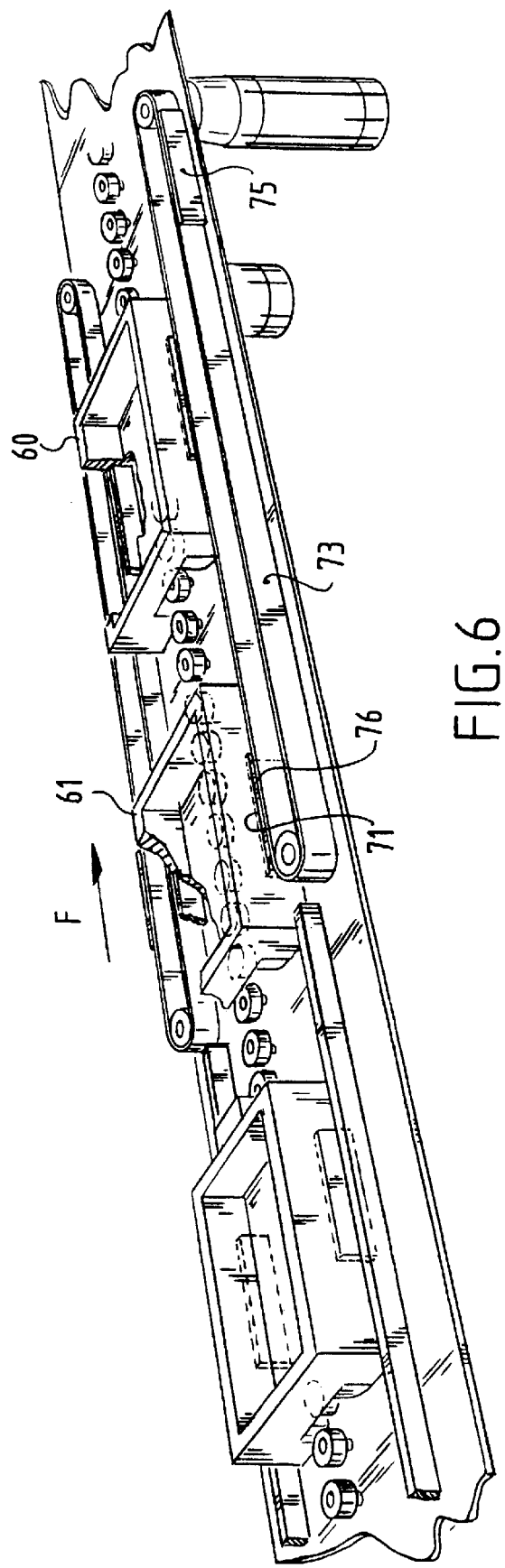
FIG. 6 shows a view in perspective of the embodiment shown in FIG. 5 in a second operating position.

In FIG. 6 product carrier 61 is transported slightly further in the direction of arrow F, wherein friction material 76 and 71 mutually engage. Conveyor belt 73 can now be driven at high speed until product carrier 61 joins onto product carrier 60.

Figure 4:
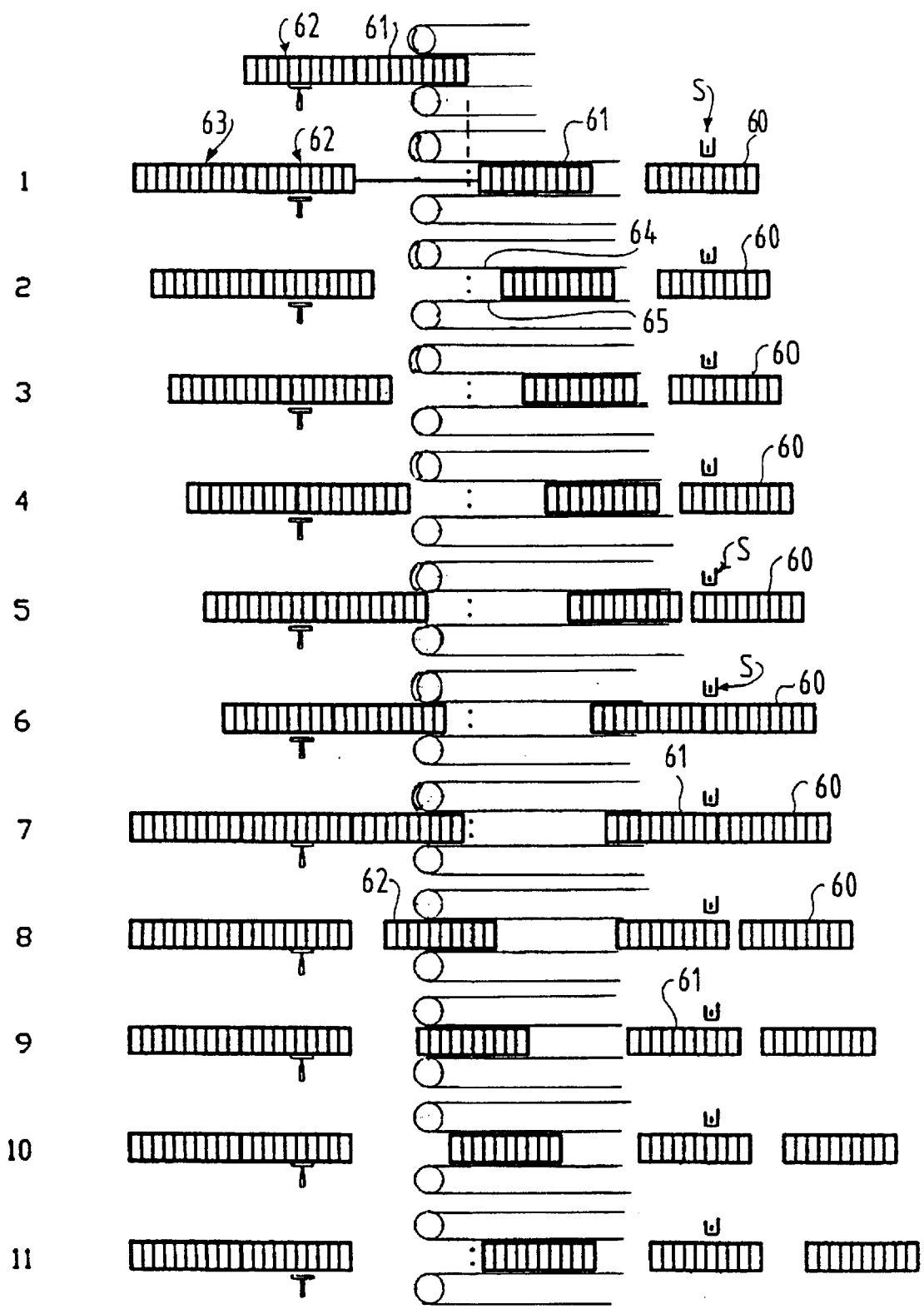
FIG. 4 is a schematic top view of a further preferred embodiment of a product carrier system according to the present invention.
Figure 5:
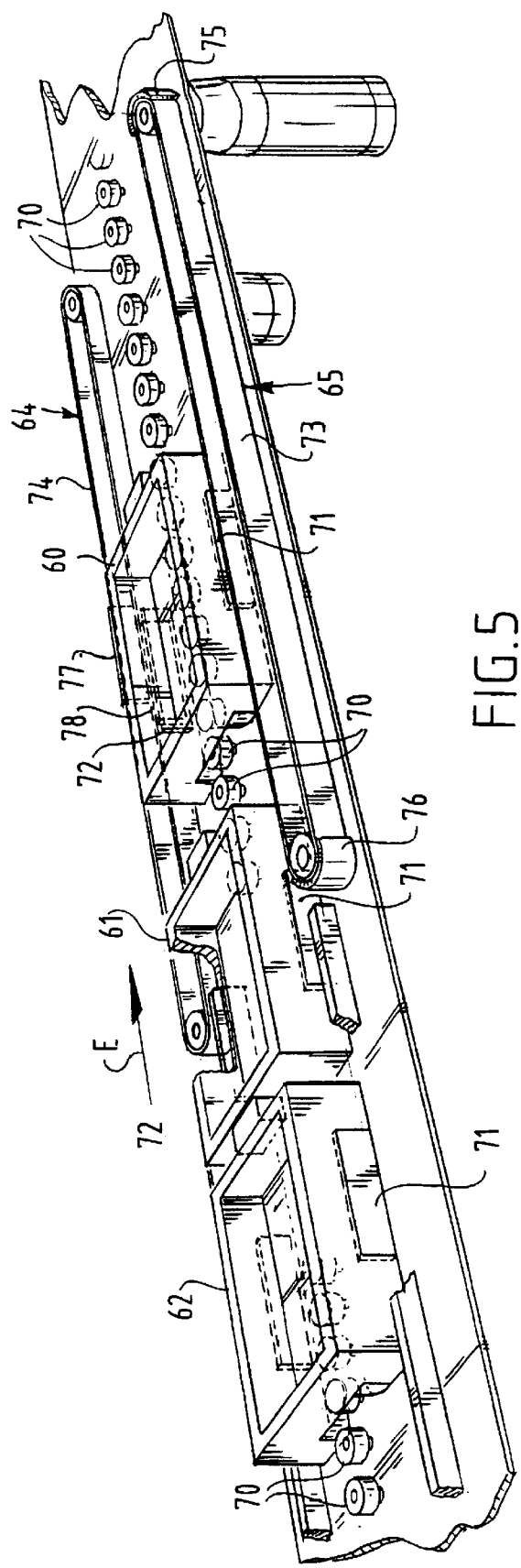
FIG. 5 shows a view in perspective of the preferred embodiment shown schematically in FIG. 4.
Figure 7:
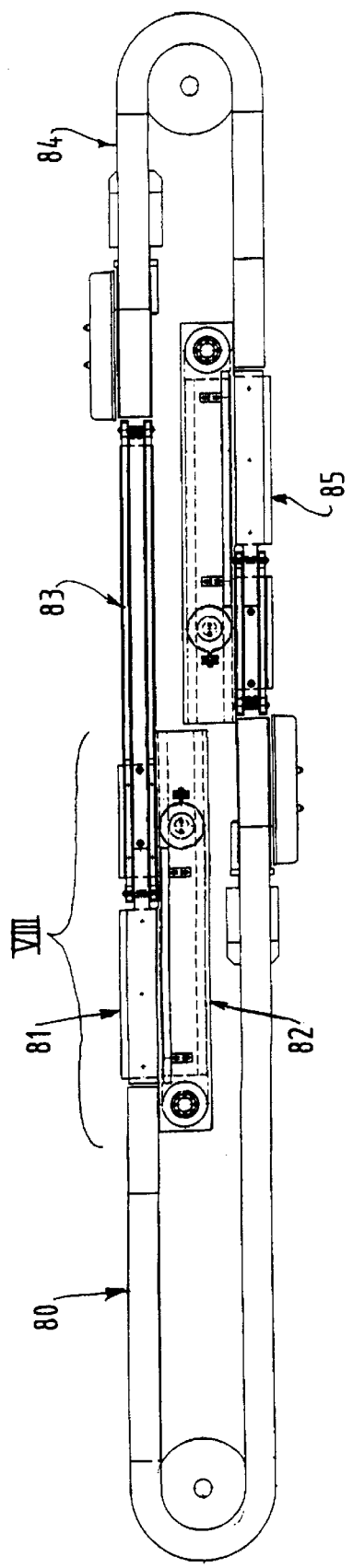
FIG. 7 is a schematic top view of a further preferred embodiment of a system according to the present invention.

In the schematically designated arrangement of FIG. 7 product carriers are carried via feed part 80 to for instance an unloading station 81 where products are removed from the product carriers and wherein the positioning takes place for instance in the manner shown in FIGS. 4–6. The product carriers are taken therefrom to an outfeed part 84 where the product carriers are transported to a loading station 85 with random interspacing and speeds.

Figure 8:
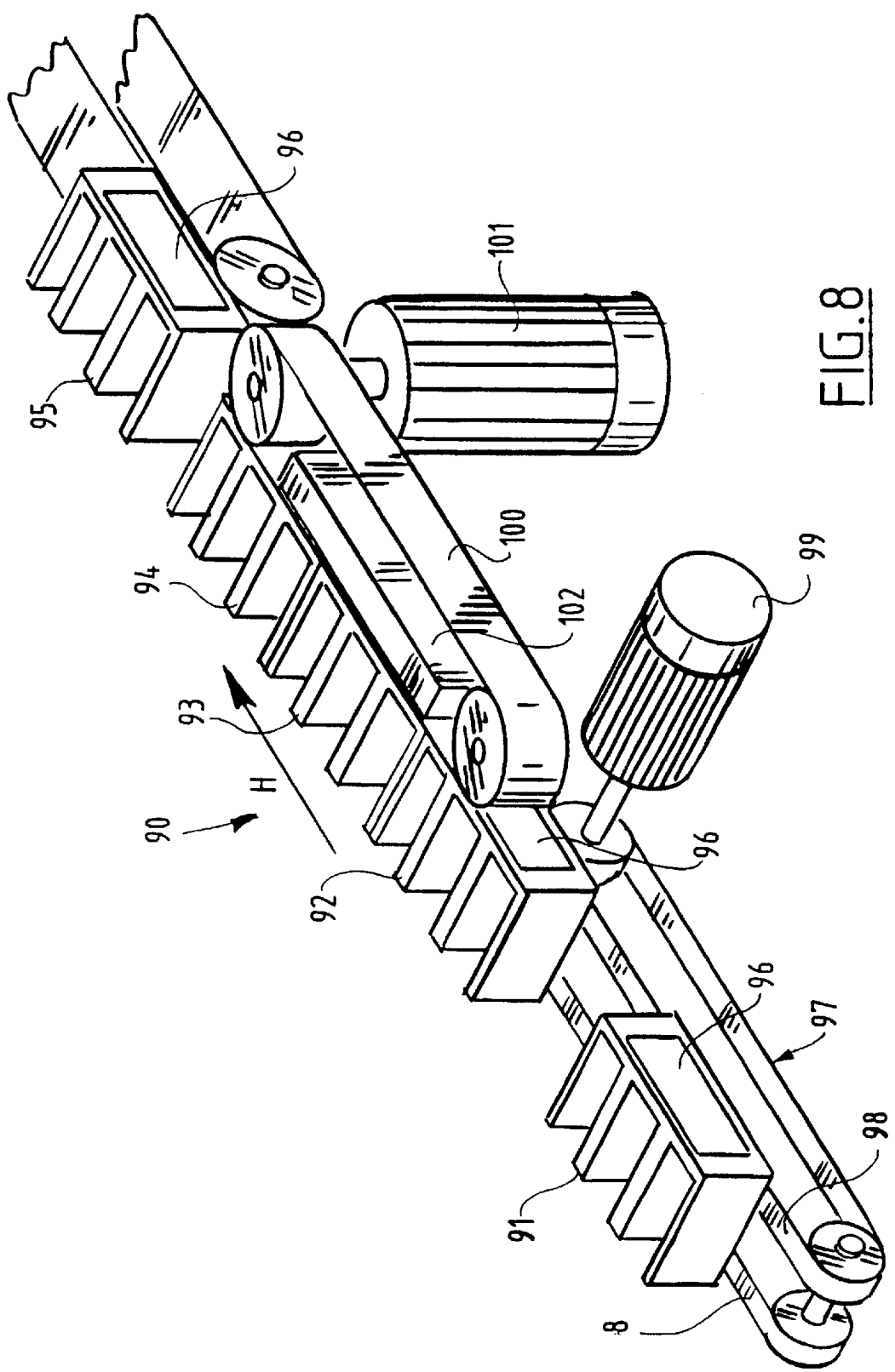
FIG. 8 shows a view in perspective of detail VIII of FIG. 7.

In a further preferred embodiment according to FIG. 8 for a loading or unloading station 90, product carriers 91, 92, 93, 94 and 95 are provided on the sides with a plate 96 of magnetizable material such as steel. These are supplied using a feed conveyor 97 which preferably comprises two endless belts 98 at a mutual distance, wherein the speed of the belts is determined by electric motor 99. The stepwise driving of the product carriers in the direction of arrow H is effected by a laterally disposed conveyor belt 100 which is drivable via a servomotor 101 and inside which is placed a strong permanent magnet 102.

A product carrier, such as 91, is supplied by feed conveyor 97 at relatively high speed, whereafter the forward movement thereof is continued by the co-action of conveyor belt 100 and permanent magnet 102 which presses product carriers such as 92, 93 and 94 against this conveyor belt 100. As soon as the product carriers are engaged by the magnetic force the conveyor belts 98 can slip through beneath them. Product carriers 92, 93 and 94 are joined together because the metal plate in each case attracts a following product carrier which is likewise provided with a steel plate and the product carriers are held firmly with their end walls against each other by this magnetic force.

Product carriers 92, 93 and 94, which are supplied from the left-hand side in the figure with random interspacing, are advanced precisely through one product position at a time by the servomotor, which may be equally important both for loading with products and unloading of products. It is of course also advantageous if an entire system can be embodied with substantially the same supply and discharge stations.

Figure 9:
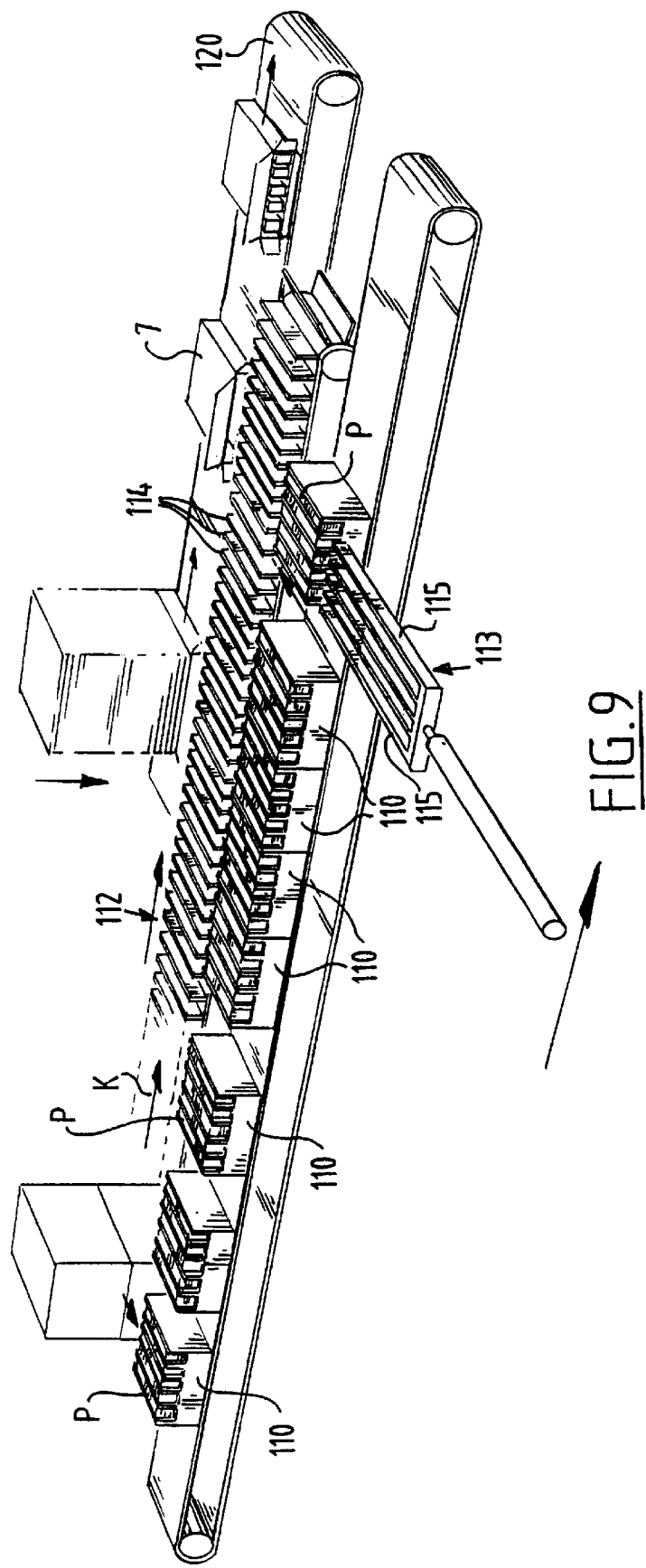
FIG. 9 is a view in perspective of a further preferred embodiment of a system according to the present invention.

In the preferred embodiment of FIG. 9 the product carrier 110 filled with products is supplied in the direction of arrow K while a so-called cup chain 112 is arranged adjacently of supply conveyor 111. In a manner not shown the product carriers 110 are joined together in the correct manner close to a pushing member 113 using restraining means so that push-out member 113 can press products P into the interspace between carrier members 114 on cup chain 112, while supply conveyor 111 and cup chain 112 advance at substantially the same constant speed and the pushing member 113, which is provided in the present embodiment with four fingers 115, is likewise co-displaced at the same constant speed transversely of the push-out direction. Fingers 115 have a length such that they can displace the products into a packing box Z which are fed on a conveyor 120 behind the conveyor 112.

Figure 10:
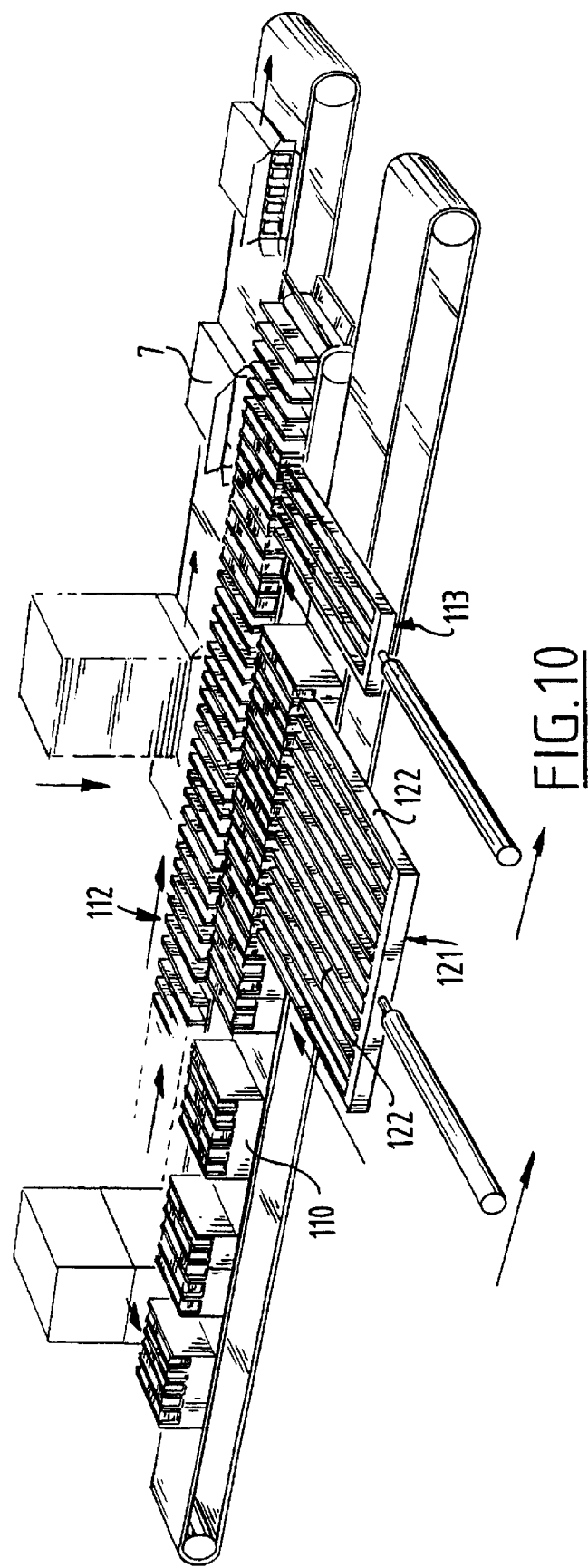
FIG. 10 is a view in perspective of a further preferred embodiment of a system according to the present invention.

In the embodiment of FIG. 10, wherein the same components are designated as far as possible with the same numerals as in FIG. 9, the product carriers 110 are emptied into cup chain 112 using a push-out member 121 which is provided for instance with sixteen fingers 122, whereafter a second push-out member 113 provides pushing of products out of cup chain 112 into a box Z.

Figure 11:
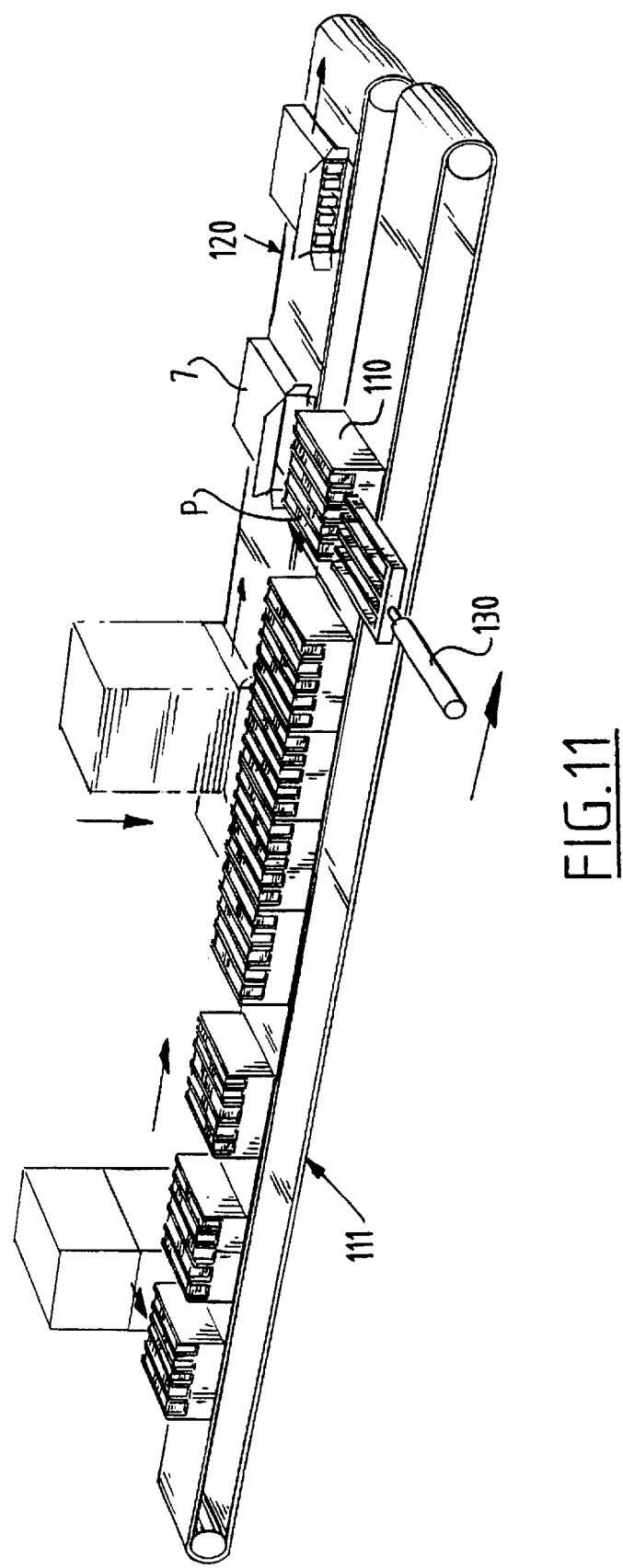
FIG. 11 shows a view in perspective of a further preferred embodiment of a system according to the present invention.

Finally, in the embodiment according to FIG. 11, wherein the reference numerals of FIG. 9 are used once again, products P are carried by a co-travelling pushing member 130 from a product carrier 110 directly into a box supplied by a conveyor 120.

As will be apparent, the embodiments of FIGS. 9, 10 and 11 provide options for placing products in simple manner in packing boxes, wherein the stopping and starting movements are dispensed with which are necessary in other existing systems and which result in undesired forces on the products. Owing to this movement, existing systems usually have a limited capacity.

The present invention is not limited to the above described preferred embodiments thereof; the rights applied for are defined by the following claims.

We claim:

1. A system for advancing one or more carrying means in which is received a plurality of products for processing, comprising:
   a first conveyor for supplying the carrying means;
   a second conveyor arranged connecting onto the first conveyor for taking over a carrying means at a precisely determined distance relative to a preceding carrying means, which comprise magnetizable material;
   magnetizing means arranged for engaging the carrying means onto the second conveyor; and
   a carrier device for carrying a plurality of infeedable and outfeedable products, which is provided with engaging means for causing transporting means to engage precisely for step wise and uniform placement of the product carrier device, wherein at least one of the engaging means comprises magnetizable material.

2. The system as claimed in claim 1, wherein the engaging means comprises one or more recesses in which parts of a chain or protrusions thereon engage precisely.

3. The system as claimed in claim 1, wherein the engaging means comprise a plate of magnetizable material.

4. The system as claimed in claim 3, wherein the plate is fixed close to the middle thereof to a base part of the carrier device and the plate is at least slightly flexible in the direction of the outer ends.

5. The carrier device as claimed in claim 4, wherein the plate takes a thickened form in the vicinity of the outer ends.

6. The system as claimed in claim 1, wherein a permanent magnet is arranged directly beneath the second conveyor.

7. The system as claimed in claim 1, further comprising a reversing wheel for carrying back empty carrying means in an overturned position at a lower level.

8. The system as claimed in claim 7, wherein said engaging means of said carrier device comprises a plate of magnetizable material.

9. The system as claimed in claim 1, wherein the engaging means comprise one or more portions of friction material onto which a part of a conveyor can engage.

10. The system as claimed in claim 1, further comprising a carrier device for carrying a plurality of infeedable and outfeedable products, having a means for causing transporting means to engage precisely for step wise and uniform placement of the product carrier device, wherein at least one of the engaging means comprises magnetizable material and wherein the engaging means comprises one or more portions of friction material onto which a part of a conveyor can engage, and wherein two conveyors are disposed laterally of a product carrier device for advancing the product carrier alternately by the left-hand respectively right-hand conveyor at a loading/unloading station.

11. The system as claimed in claim 1, wherein products are pushed out of the carrier device by a pushing member, the products are pushed into a conveyor running adjacent the feed conveyor and provided with carrier means.

12. The system as claimed in claim 11, wherein packing boxes are supplied adjacent the conveyor provided with carrier members and the products are pushed therein.

13. The system as claimed in claim 11, further comprising a second pushing member for pushing the products into packing boxes.

14. The system as claimed in claim 13, for discharging products into packing boxes, wherein packing boxes are moved at substantially the same speed on a conveyor adjacent the discharge conveyor for carrying means for the products and wherein the products are pushed out of the carrier device directly into the box by a transversely and longitudinally movable pushing member.

15. A system for advancing one or more carrying means in which is received a plurality of products for processing comprising:
   at least one carrying means being comprised of magnetizable material;
   a first conveyor for supplying the carrying means;
   a second conveyor connected to said first conveyor, said second conveyor accepts said at least one carrying means from said first conveyor at a precisely determined distance relative to a preceding carrying means; and
   magnetizing means located adjacent said first and second conveyors, said magnetizing means facilitating the engagement of said carrying means onto said second conveyor from said first conveyor.

* * * * *